(12) United States Patent
Chiang

(10) Patent No.: US 6,494,777 B1
(45) Date of Patent: Dec. 17, 2002

(54) CARBON DIOXIDE CONCENTRATION MODULATING DEVICE

(75) Inventor: Shen-Kwan Chiang, Hsichi Taipei Hsien (TW)

(73) Assignee: King Can Industry Corporation, Taipei Hsien (TW)

( * ) Notice: Subject to any disclaimer, the term of this patent is extended or adjusted under 35 U.S.C. 154(b) by 0 days.

(21) Appl. No.: 09/955,064

(22) Filed: Sep. 19, 2001

(51) Int. Cl.$^7$ ................................................ B60H 1/24
(52) U.S. Cl. ...................... 454/75; 454/139; 454/205; 454/229
(58) Field of Search ..................... 454/75, 139, 201, 454/202, 205, 225

(56) References Cited

U.S. PATENT DOCUMENTS

| | | | | |
|---|---|---|---|---|
| 5,261,596 A | * | 11/1993 | Tachibana et al. | 165/248 |
| 5,292,280 A | * | 3/1994 | Janu et al. | 454/229 |
| 5,464,369 A | * | 11/1995 | Federspiel | 236/49.3 |
| 5,775,406 A | * | 7/1998 | Ghitea, Jr. | 165/11.1 |
| 6,161,764 A | * | 12/2000 | Jatnieks | 165/249 |

FOREIGN PATENT DOCUMENTS

| | | |
|---|---|---|
| CN | 256351 | 9/1995 |
| KR | 2001054077 | * 7/2001 |

* cited by examiner

*Primary Examiner*—Harold Joyce
(74) *Attorney, Agent, or Firm*—Rothwell, Figg, Ernst & Manbeck

(57) ABSTRACT

An air-quality conditioning device is proposed, which can be singly used or used in combination with a small air conditioner. In an enclosed space, concentration of carbon dioxide is detected by a carbon dioxide concentration detecting module of the device. While the detected concentration of carbon dioxide reaches a predetermined upper limit value, an air conditioning mechanism is driven by an air-conditioning controlling module for introducing external fresh air to the space. While the carbon dioxide concentration reduces to a predetermined lower limit value, the air conditioning mechanism is driven for stopping the introduction of the external air. Therefore, the carbon dioxide concentration can be properly adjusted in the space so as to maintain good air quality therein.

8 Claims, 2 Drawing Sheets

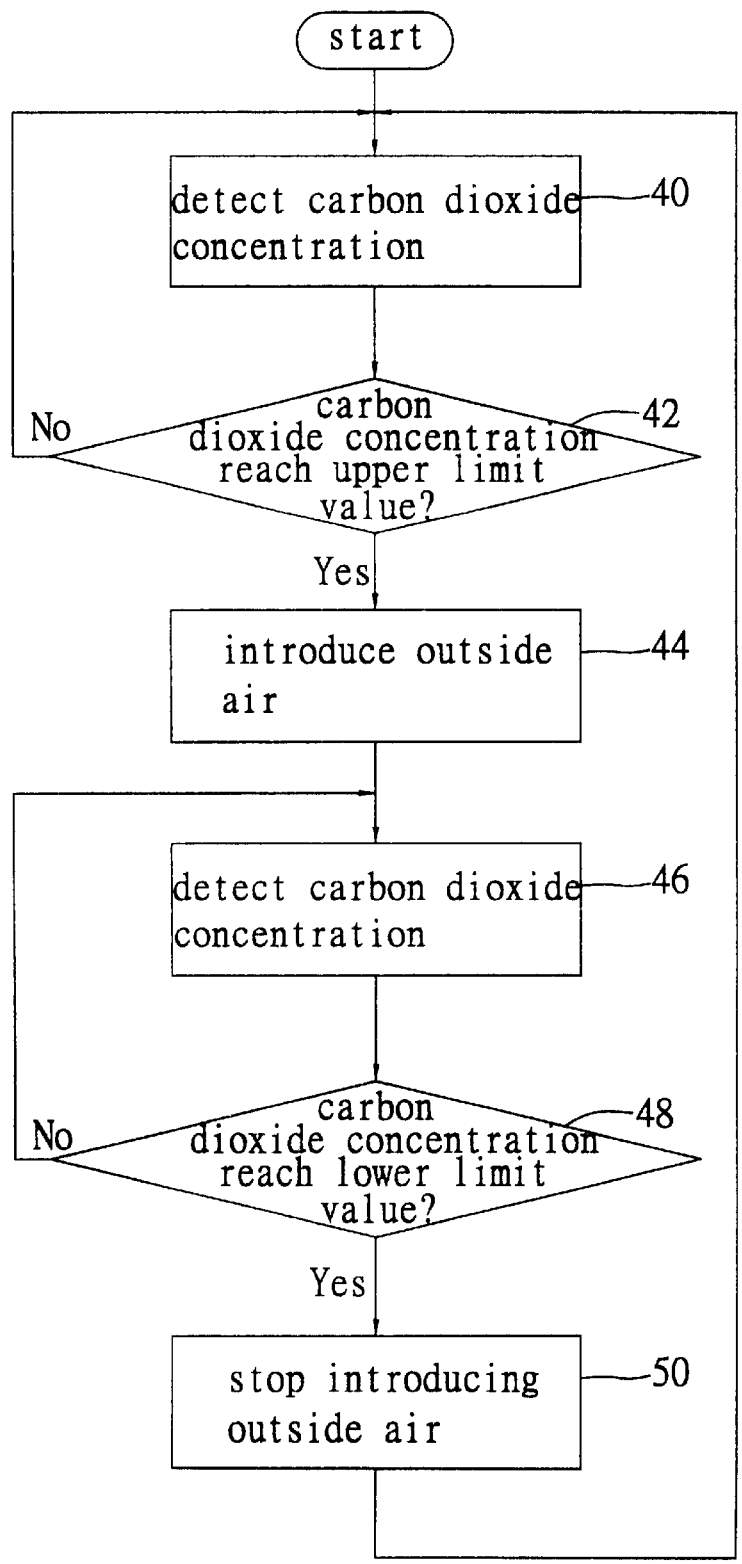

CARBON DIOXIDE CONCENTRATION MODULATING DEVICE

FIELD OF THE INVENTION

The present invention relates to air-quality conditioning devices, and more particularly, to an air-quality conditioning device, which can be used in combination with a small-scale air conditioner or used singly for effectively controlling carbon dioxide concentration in an enclosed space, so as to maintain good air quality in the space.

BACKGROUND OF INVENTION

It has been reported that excess intake of carbon dioxide into a human body slows down brain activity and response, and makes people easily feel sleepy. This particularly tends to occur in an enclosed space such as a restaurant, hospital, movie theater, building, factory, classroom, library, car or train. In such a space with all windows and doors being shut in operation of an air conditioner, carbon dioxide generated from people's breath rapidly accumulates, which deteriorates air quality in the space and makes people feel sleepy due to excess intake of carbon dioxide.

As mentioned above, for people staying in the enclosed space for a long period of time, such as an office worker in an office or a student in a library or study room, the efficiency of working or studying can therefore be undesirably degraded by the excess concentration of carbon dioxide in the space. Moreover, in particular for a driver in an enclosed car, MRT or train, bad air quality affecting the driver's consciousness even deteriorates the driving quality and safety.

In accordance with the foregoing problems, Chinese New Model Publication No. 256351 discloses an air conditioning device for controlling indoor carbon dioxide concentration in a manner of exchanging indoor air with outdoor air, in which a carbon dioxide detector is used for monitoring the indoor carbon dioxide concentration, while an outdoor air valve is adjusted in response to the monitored concentration value for providing a proper amount of outdoor air so as to maintain good indoor air quality.

However, the above air conditioning device can merely be applied to a large-scale indoor air conditioning system, and the device is complicated in structure, large in profile and costly in manufacture, so that it can not be widely used.

SUMMARY OF THE INVENTION

A primary objective of the present invention is to provide an air-quality conditioning device, which is structurally simple, properly sized and cost-effectively manufactured. Moreover, the device can be used in combination with a small-scale air conditioner or used singly for effectively controlling carbon dioxide concentration in an enclosed space, so as to maintain good air quality in the space.

In accordance with the foregoing and other objectives, the present invention proposes an air-quality conditioning device, comprising a carbon dioxide concentration detecting module, an air-conditioning controlling module and an air conditioning mechanism. The detecting module is used to detect concentration of carbon dioxide in an enclosed space; while the detected concentration reaches a predetermined upper limit value, the air conditioning mechanism is driven by the air-conditioning controlling module for introducing fresh air from outside to the enclosed space, so as to reduce the concentration of carbon dioxide. Moreover, while the carbon dioxide concentration in the space is reduced to a predetermined lower limit value as detected by the detecting module, the air conditioning mechanism is further driven by the air-conditioning controlling module for stopping the introduction of outside air to the space. In such a manner of repetitively detecting and adjusting the carbon dioxide concentration by properly introducing the outside fresh air to the enclosed space, the carbon dioxide concentration can be effectively controlled so as to maintain good air quality in the space.

In this case, the carbon dioxide concentration detecting module employs a conventional optical sensing technique or an electrochemical technique for detecting the concentration of carbon dioxide.

In addition, the air conditioning mechanism has a freely-openable air inlet for introducing the, outside fresh air to the enclosed space. Furthermore, on or beside the air inlet there is formed an air-sucking means for facilitating the introduction of outside air. Moreover, on or beside the air inlet there is further disposed a filtering means for filtering out impurities in the introduced air.

Besides, the air-conditioning controlling module can also be constructed in a manner of generating a sound or visual signal to notify a user when the carbon dioxide concentration detected by the carbon dioxide concentration detecting module reaches the upper or lower limit value respectively, and accordingly the user can manually control the air conditioning mechanism for introducing the outside air or stopping the air introduction.

The air-quality conditioning device of the invention can be integrally constructed with a small-scale air conditioner such as a window-type air conditioner, a separable-type air conditioner or a car air conditioning system, as well as can be independently fabricated for being used singly or used in association with a pre-existing air conditioning device.

BRIEF DESCRIPTION OF THE DRAWINGS

The present invention can be more fully understood by reading the following detailed description of the preferred embodiments, with reference made to the accompanying drawings wherein:

FIG. 3 is a schematic diagram showing the steps involved in using a preferred embodiment of the air-quality conditioning device of the invention.

DETAILED DESCRIPTION OF THE PREFERRED EMBODIMENT

Figure 1:
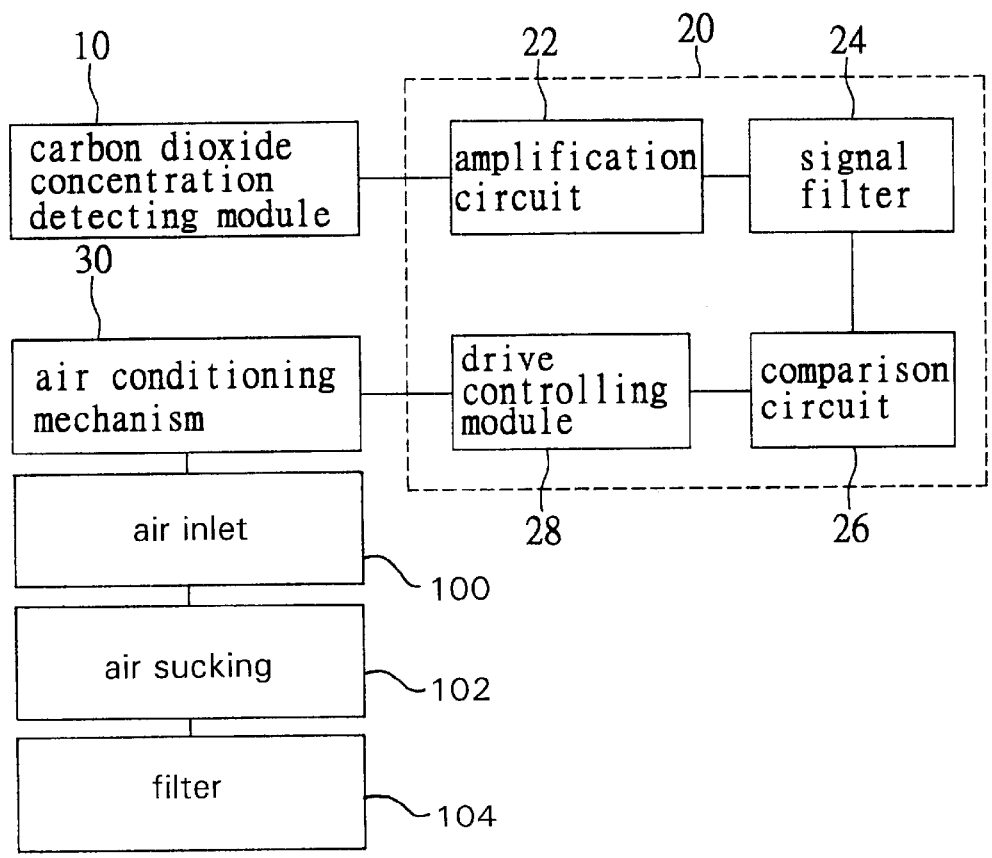
FIG. 1 is a schematic diagram of a preferred embodiment of the air-quality conditioning device of the invention.

As shown in FIG. 1, the air-quality conditioning device of the invention comprises a carbon dioxide concentration detecting module 10, an air-conditioning controlling module 20 and an air conditioning mechanism 30, wherein the carbon dioxide concentration detecting module 10 employs a conventional optical sensing technique or an electrochemical technique for detecting concentration of carbon dioxide in a enclosed space.

The air-conditioning controlling module 20 comprises an amplification circuit 22, a signal filter 24, a comparison circuit 26 and a drive controlling module 28. While the carbon dioxide concentration detecting module 10 outputs a small voltage signal to the air-conditioning controlling module 20 in response to the detected concentration of carbon dioxide, the small voltage signal is amplified by the amplification circuit 22 for easy recognition. However, as the amplified signal generally contains impurities, the signal filter 24 is used for filtering the voltage signal and eliminating the impurities so as to increase preciseness for signal recognition. When a voltage signal is generated by the detecting module 10 as the carbon dioxide concentration in the enclosed space reaches a predetermined upper limit value e.g. 1,000 ppm, the comparison circuit 26 correspondingly outputs a signal to the drive controlling module 28 for driving the air conditioning mechanism 30 to introduce fresh air from outside to the enclosed space, so as to reduce the carbon dioxide concentration. In the case of a voltage signal generated by the detecting module 10 showing that the carbon dioxide concentration reaches a predetermined lower limit value e.g. 600 ppm, another signal is then output from the comparison circuit 26 for driving the air conditioning mechanism 30 to stop the introduction of outside air to the enclosed space.

The air conditioning mechanism 30 is further provided with a freely-openable air inlet 100 for introducing fresh air from the outside to the enclosed space. Moreover, on or beside the air inlet 100 there can be formed an air-sucking means 102 such as an air-sucking fan, so as to facilitate the introduction of the outside air. Furthermore, in order to purify the introduced air, there can be additionally disposed a filtering means 104 such as a filtering mesh, in an effort to eliminate impurities in the introduced air. In addition, the air conditioning mechanism 30 can also be a conventional gas exchanging apparatus for achieving the purpose of sucking air or stopping the air sucking.

Figure 2:
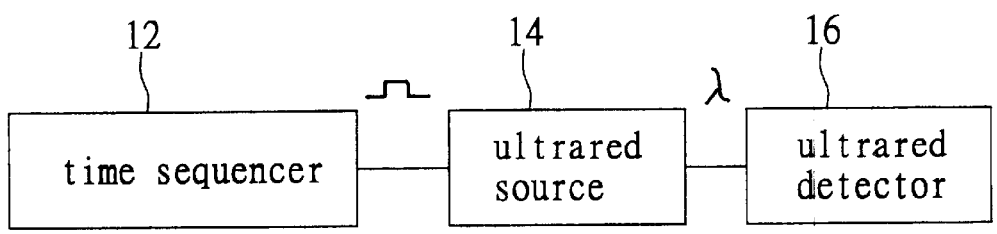
FIG. 2 is a schematic diagram of a preferred embodiment of a carbon dioxide concentration detecting module used in the air-quality conditioning device of the invention.

The carbon dioxide concentration detecting module 10 is further depicted in detecting mechanism with reference to an ultrared optical sensing technique. As shown in FIG. 2, the carbon dioxide concentration detecting module 10 comprises a timing sequencer 12, an ultrared source 14 and an ultrared detector 16. The detecting mechanism operates in a manner that first, the timing sequencer 12 provides a square-wave signal for driving the ultrared source 14. The signal can be selected in frequency of 2.84 Hz, allowing the ultrared source 14 to switch at the frequency of 2.84 Hz for flashing, which is advantageous for saving electricity and can be distinguishable from an external light source having a frequency of 60 Hz. Then, after focusing, the ultrared source 4 flashes light in parallel toward the ultrared detector 16. Subsequently, the ultrared detector 16 receives the light left after being absorbed by carbon dioxide, and estimates the concentration of carbon dioxide according to an amount of the left light, so as to output a small voltage signal to the amplification circuit 22 of the air-conditioning controlling module 20 for amplifying the signal corresponding to the estimated concentration of carbon dioxide.

The principle of the electrochemical technique is to diffuse inside air through a diffusion-inhibiting layer to a liquid electrolyte having a measuring electrode, a counting electrode and a reference electrode. A capacitor is used for continuously providing a voltage between the measuring electrode and the reference electrode, allowing carbon dioxide to be electrochemically converted at the measuring electrode, so as to generate a voltage corresponding in intensity to the carbon dioxide concentration. This accordingly makes the air-conditioning controlling module 20 compare and determine if the carbon dioxide concentration reaches a predetermined value.

FIG. 3 illustrates the procedure for using the air-quality conditioning device of the invention. First, the air-quality conditioning device is turned on, and in step 40, a carbon dioxide concentration detecting module 10 detects the concentration of carbon dioxide in an enclosed space.

In step 42, the carbon dioxide concentration detecting module 10 outputs a small voltage signal to an air-conditioning controlling module 20 corresponding to the detected carbon dioxide concentration. The air-conditioning controlling module 20 then amplifies and filters the small voltage signal to be compared with a predetermined upper limit value, so as to determine if the carbon dioxide concentration reaches the upper limit value. If it does, then step 44 is executed; if not, return to step 40 for continuously detecting the carbon dioxide concentration by the carbon dioxide concentration detecting module 10.

In step 44, while the carbon dioxide concentration reaches the upper limit value as determined by the air-conditioning controlling module 20, an air conditioning mechanism 30 is driven for introducing outside fresh air to the enclosed space, so as to reduce the carbon dioxide concentration.

In step 46, while the air conditioning mechanism 30 introduces outside fresh air to the enclosed: space, the carbon dioxide concentration detecting module 10 continuously detects the carbon dioxide concentration.

In step 48, the air-conditioning controlling module 20 compares the detected carbon dioxide concentration with a predetermined lower limit value for determining if the carbon dioxide concentration reaches the lower limit value. If it does, step 50 is executed; if not, return to step 46 for continuously detecting the carbon dioxide concentration by the carbon dioxide concentration detecting module 10, while the air conditioning mechanism 30 keeps introducing outside fresh air to the enclosed space.

In step 50, while the carbon dioxide concentration reaches the lower limit value as determined by the air-conditioning controlling module 20, the air conditioning mechanism 30 is driven for stopping the introduction of outside fresh air to the enclosed space.

Subsequently, the procedure re-starts from step 40. In this case, the carbon dioxide concentration is repetitively detected and determined, so as to properly introduce external fresh air to the enclosed space for effectively controlling the carbon dioxide concentration and for maintaining good air quality in the space, until the air-quality conditioning device of the invention is turned off.

In addition, while the carbon dioxide concentration detected by the carbon dioxide concentration detecting module 10 reaches the upper or lower limit value respectively, the air-conditioning controlling module 20 can also be constructed to generate a sound or visual signal such as a noise or flash, for allowing a user to manually control the air conditioning mechanism 30 for introducing outside fresh air to the enclosed space or stopping the air introduction. This can also achieve the effective controlling for the carbon dioxide concentration so as to maintain good air quality.

In conclusion, the air-quality conditioning device of the invention, which is structurally simple, properly sized and cost-effectively manufactured, integrally constructed with a small-scale air conditioner such as a window-type air conditioner or a car air-conditioning system, as well as can be independently fabricated for being used singly or used in association with a pre-existing air conditioner, so as to maintain good air quality in an enclosed space such as house or car. This makes people staying in such a space in good condition of consciousness, so as to effectively improve working or studying efficiency, or increase driving safety.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A carbon dioxide concentration modulating device, comprising:

a carbon dioxide concentration detecting module for detecting concentration of ambient carbon dioxide and for outputting a voltage signal corresponding to the detected concentration of carbon dioxide;

an air-conditioning mechanism for introducing external air; and an air-conditioning controlling module connected to the carbon dioxide concentration detecting module and the air conditioning mechanism, for receiving the voltage signal outputted from the carbon dioxide concentration detecting module, and for processing the voltage signal to interpret the detected concentration of carbon dioxide so as to drive the air conditioning mechanism to operate, wherein the air-conditioning controlling module is preset with predetermined upper and lower limit values of carbon dioxide concentration, and includes an amplification circuit, a signal filter, a comparison circuit and a drive controlling module;

wherein the amplification circuit and the signal filter respectively amplify and filter the voltage signal so as to allow the comparison circuit to output a signal to the drive controlling module for driving the air conditioning mechanism to introduce external air if the detected concentration of carbon dioxide reaches the predetermined upper limit value, and to allow the comparison circuit to output another signal to the drive controlling module for driving the air conditioning mechanism to stop the air introduction if the desired concentration of carbon dioxide reaches the predetermined lower limit value.

2. The device of claim 1, wherein the carbon dioxide concentration detecting module employs an optical sensing technique for detecting the concentration of carbon dioxide.

3. The device of claim 1 wherein the carbon dioxide concentration detecting module employs an electrochemical technique for detecting the concentration of carbon dioxide.

4. The device of claim 2, wherein the carbon dioxide concentration detecting module includes a time sequencer, an ultrared source and an ultrared detector.

5. The device of claim 4, wherein the time sequencer provides a square-wave signal for driving the ultrared source to switch at a frequency of the square-wave signal and flash light in parallel toward the ultrared detector after focusing, so as to allow the ultrared detector to receive the light left after being absorbed by carbon dioxide, and estimate the concentration of carbon dioxide according to an amount of the left light, for outputting a small voltage signal to the air-conditioning controlling module corresponding to the estimated concentration of carbon dioxide.

6. The device of claim 1, wherein the air conditioning mechanism has a freely-openable air inlet for introducing the external air.

7. The device of claim 6, wherein an air-sucking means is formed in proximity to the air inlet for facilitating the introduction of the external air.

8. The device of claim 7, wherein a filtering means is formed in proximity to the air inlet for filtering out impurities in the external air.

* * * * *